(12) United States Patent
Adachi et al.

(10) Patent No.: US 8,481,148 B2
(45) Date of Patent: Jul. 9, 2013

(54) OPTICAL DEVICE AND ANTIREFLECTION FILM

(75) Inventors: Makoto Adachi, Tokyo (JP); Tsuneo Muraki, Tokyo (JP); Kazuo Kawamata, Tokyo (JP)

(73) Assignee: Hoya Corporation, Tokyo (JP)

( * ) Notice: Subject to any disclaimer, the term of this patent is extended or adjusted under 35 U.S.C. 154(b) by 245 days.

(21) Appl. No.: 12/988,754

(22) PCT Filed: Apr. 27, 2009

(86) PCT No.: PCT/JP2009/058243
§ 371 (c)(1),
(2), (4) Date: Oct. 20, 2010

(87) PCT Pub. No.: WO2009/133833
PCT Pub. Date: Nov. 5, 2009

(65) Prior Publication Data
US 2011/0033681 A1    Feb. 10, 2011

(30) Foreign Application Priority Data

Apr. 30, 2008    (JP) ................................. 2008-119081

(51) Int. Cl.
*G02B 1/11*  (2006.01)
*B32B 7/02*  (2006.01)
*B32B 9/00*  (2006.01)
*G02C 7/02*  (2006.01)

(52) U.S. Cl.
USPC ........ 428/213; 428/701; 351/159.01; 359/588

(58) Field of Classification Search
None
See application file for complete search history.

(56) References Cited

U.S. PATENT DOCUMENTS 3,922,068 A * 11/1975 Uetsuki .......................... 359/588
6,768,581 B1 * 7/2004 Yip et al. ...................... 359/355

FOREIGN PATENT DOCUMENTS

| EP | 0 918 044 A1 | 5/1999 |
| EP | 1 092 991 A2 | 4/2001 |
| JP | 2000 280738 | 10/2000 |
| JP | 2001 74903 | 3/2001 |
| JP | 2004 77989 | 3/2004 |
| JP | 2005 215038 | 8/2005 |
| JP | 2006 126233 | 5/2006 |

OTHER PUBLICATIONS

Jalie, M. "Materials for spectacle lenses", (2005). pp. 26-32.*
International Search Report issued Jul. 7, 2009 in PCT\JP09/058243 filed Apr. 27, 2009.
Extended Search Report mailed Jan. 9, 2013, in European Patent Application No. 09738770.8.

* cited by examiner

*Primary Examiner* — Maria Veronica Ewald
*Assistant Examiner* — Prashant J Khatri
(74) *Attorney, Agent, or Firm* — Oblon, Spivak, McClelland, Maier & Neustadt, L.L.P.

(57) ABSTRACT

An antireflection film is formed by alternately laminating a low refractive index layer and a high refractive index layer. The antireflection film has a reflectance of 10% or less and an excitation purity range of 10 or less for visible light in a wavelength range from 380 nm to 780 nm incident at an incident angle ranging from 0° to 45° when regarding the direction perpendicular to the surface as 0°. The antireflection film inhibits a specific color tone from occurring in interference color of incident light coming from an oblique direction.

12 Claims, 6 Drawing Sheets

OPTICAL DEVICE AND ANTIREFLECTION FILM

TECHNICAL FIELD

The present invention relates to an optical element (i.e., optical device) configured by forming an antireflection film on at least one surface of an optically transparent substrate, as well as the antireflection film, wherein the antireflection film is formed on the substrate by alternately laminating a low refractive index layer and a high refractive index layer.

BACKGROUND ART

An optical element configured using an optically transparent substrate is typically provided with an antireflection film to reduce the reflected light of the incident light.

For example, in the case of a plastic lens for spectacles or the like, the following advantages can be achieved by providing the antireflection film. For example, by controlling the reflectance of incident light coming from a direction perpendicular to the substrate, the transmittance of the light coming from the perpendicular direction can be increased. Further, by preventing reflection of the lens surface facing the eye, user's feeling of flicker caused by the reflection can be inhibited.

A problem with the antireflection film is that the reflection characteristics thereof vary depending on the incident angle of light incident on the optical element. The optical element such as a spectacle lens, a display panel of a display or the like has higher probability to be looked from an oblique direction than from the front. Generally, by controlling the reflectance of the light coming from the perpendicular direction, flicker when seeing from the oblique direction can be substantially inhibited.

However, since the optical element and optical equipment with the optical element incorporated therein have been provided with various high functions, there is a need to not only more reduce the reflectance of the light coming from the perpendicular direction, but also reduce the reflectance of the light coming from the oblique direction. To satisfy such need, an art is proposed in which, by reducing the reflectance of the entire antireflection film as much as possible, the reflectance of light incident coming from the oblique direction is also reduced (see, for example, Patent Document 1)

PRIOR ART DOCUMENT

Patent Document

[Patent Document 1] Japanese Unexamined Patent Application Publication No. 2001-74903

DISCLOSURE OF THE INVENTION

Problems to be Solved by the Invention

In the case of the aforesaid optical element used as the spectacle lens, the display or the like, not only the intensity (the reflectance) of the reflected light from the optical element, but also the color tone (interference color) of the light reflected on the optical element needs to be considered. This is because even when the reflectance is low, if image slightly reflected on the surface of the optical element is tinged with a distinctive color, the look of the optical element will be adversely affected. For example, if the interference color associated with the reflection of a colored optical element, such as sunglasses, is tinged with a specific color tone, there will be a concern that the fashionability of the sunglasses might be adversely affected. Further, in the case of a display panel of a display or the like, unnecessary color will be added to the images, marks and the like displayed on the display panel.

In the art disclosed in Patent Document 1, although the reflectance is reduced as much as possible, the color tone of the interference color (specifically, the excitation purity of the interference color) is not considered at all. Thus, in the case of the spectacle lens worn by a wearer who moves so that the viewing angle of the surrounding people changes, it is required to not only sufficiently consider the reflectance of the incident light coming from the oblique direction, but also sufficiently consider the excitation purity of the interference color of the incident light coming from the oblique direction. Further, compared with other optical elements, since the spectacle lens has relatively large curvature (i.e., relatively small curvature radius) in many cases, and since the spectacle lens is formed as spherical or aspheric curved surface, there arises a problem that, totally different from the case where the spectacle lens is looked from the perpendicular direction, if the spectacle lens is looked from the oblique direction, the spectacle lens will be tinged with a color tone such as red color. Thus, it is required to develop an antireflection film which is less likely to cause unnecessary color when the optical element is looked from lateral direction even if the optical element has small curvature radius.

In view of the aforesaid problems, it is an object of the present invention to provide an optical element and an antireflection film in which the interference color of the obliquely incident light is less tinged with a specific color.

Means for Solving the Problems

To solve the aforesaid problems, an antireflection according to an aspect of the present invention includes an optically transparent substrate, and an antireflection film formed on at least one surface of the substrate, wherein the antireflection film is formed by alternately laminating a low refractive index layer and a high refractive index layer, and wherein the antireflection film has a reflectance of 10% or less and an excitation purity range of 10% or less for visible light in a wavelength range from 380 nm to 780 nm incident at an incident angle ranging from 0° to 45° when regarding the direction perpendicular to the surface of the substrate as 0°.

Further, an antireflection film according to another aspect of the present invention includes a low refractive index layer a high refractive index layer, wherein the antireflection film is formed by alternately laminating the low refractive index layer and the high refractive index layer and wherein the antireflection film has a reflectance of 10% or less and an excitation purity range of 10% or less for visible light in a wavelength range from 380 nm to 780 nm incident at an incident angle ranging from 0° to 45° when regarding the direction perpendicular to the surface of the substrate as 0°.

As described above, since the reflectance of both the optical element and the antireflection film is 10% or less for visible light in a wavelength range from 380 nm to 780 nm incident at an incident angle ranging from 0° to 45° when regarding the direction perpendicular to the surface of the substrate as 0°, reflection of incident light coming from the oblique direction can be sufficiently inhibited. Particularly, since the excitation purity range of both the optical element and the antireflection film is 10 or less for visible light in a wavelength range from 380 nm to 780 nm incident at an incident angle ranging from 0° to 45° when regarding the direction perpendicular to the surface of the substrate as 0°, interference color becomes close to substantially white color, i.e., color can be reliably inhibited from occurring in the interference color.

Advantages of the Invention

According to the present invention, it is possible to provide an optical element and an antireflection film capable of inhibiting a specific color tone from occurring in interference color for incident light coming from an oblique direction.

BEST MODES FOR CARRYING OUT THE INVENTION

The best embodiment for carrying out the present invention will be described below, however it should be understood that the present invention is not limited to this embodiment. The following embodiment is described using an example in which the present invention is applied to a spectacle plastic lens (as the optical element), however it should be understood that the optical element and the antireflection film according to the present invention are not limited to the spectacle lens and an antireflection film for the spectacle lens.

Figure 1:
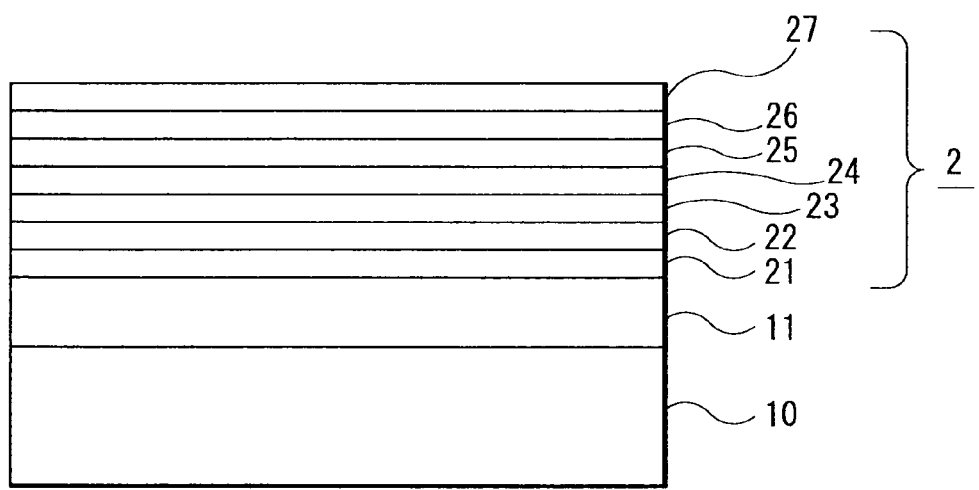
FIG. 1 is a cross section briefly showing an optical element according to an embodiment of the present invention.

FIG. 1 is a cross section briefly showing an optical element 1 according to the embodiment of the present invention. An antireflection film 2 is formed on a substrate 10 through a hard film (i.e., a so-called "hard coat") 11 for increasing abrasion resistance, weather resistance and the like, wherein the substrate 10 is optically transparent, i.e., the substrate 10 has transparency for visible light in the wavelength range from 380 nm to 780 nm (according to Japanese Industrial Standard JIS Z 8701). The antireflection film 2 is a laminated film formed by alternately laminating a low refractive index layer, which has relatively low refractive index, and a high refractive index layer, which has relatively high refractive index. The drawing shows an example in which the antireflection film 2 is configured by seven layers, which are: a low refractive index layer 21, a high refractive index layer 22, a low refractive index layer 23, a high refractive index layer 24, a low refractive index layer 25, a high refractive index layer 26, and a low refractive index layer 27. Note that the total number of the layers of the antireflection film 2 is not limited to seven. Further, in the optical element 1, a foundation layer for increasing, for example, impact resistance may also be formed between the hard film 11 and the substrate 10, and another protective layer may also be formed on the antireflection film 2.

A plastic lens material, for example, may be used as the substrate 10.

The material for forming the plastic lens is not particularly limited. Examples of the material for forming the plastic lens include: episulfide-based resin, thiourethane-based resin, polyestermethacrylate-based resin, polycarbonate resin, polyurethane methacrylate resin, urethane-based resin (for example, TRIVEX: trade name), allyl diglycol carbonate (CR39, trade name), diallyl carbonate.

Further, an organosilicon compound in which inorganic particulates are colloidally dispersed can be used as the material of the hard film (i.e., the hard coat) 11. Examples of the inorganic particulates include, for example, silica, zirconia, titania and alumina. The material of the inorganic particulates is selected according to the refractive index of the plastic substrate. For example, in the case where the substrate 10 has relatively low refractive index, silica, which is an inorganic material with low refractive index, can be used. Further, in the case where the substrate 10 has relatively high refractive index, it is preferred that titania and/or zirconia, which have low refractive index, is added.

As shown in FIG. 1, the antireflection film 2 is configured by alternately laminating a low refractive index layer, a high refractive index layer, a low refractive index layer, a high refractive index layer . . . in this order on the side of the substrate 10, and the outermost layer is a low refractive index layer.

Further, for example, silica or co-oxide of aluminum and silicon can be used as the material of the low refractive index layer of the antireflection film 2. Due to the characteristics of silica such as strength, refractive index, cost and the like, silica is preferably and most commonly used as the material of the low refractive index layer.

Further, inorganic compounds with high refractive index such as, for example, niobium oxide, tantalum oxide, zirconium oxide, and titanium oxide can be preferably used as the material of the high refractive index layer of the antireflection film 2.

It is preferred that, in addition to the aforesaid material, examples of the material for forming the antireflection film 2 also include the materials selected from the group consisting of magnesium fluoride, aluminum fluoride, calcium fluoride, barium fluoride, strontium fluoride, cryolite, chiolite, silicon oxide, neodymium fluoride, lanthanum fluoride, gadolinium fluoride, dysprosium fluoride, yttrium fluoride, aluminum oxide, zirconium oxide, hafnium oxide, cerium oxide, yttrium oxide, lanthanum oxide, titanium oxide, magnesium oxide, tantalum oxide, and niobium oxide, and the materials selected from mixture group and complex compound group formed of two or more materials selected from the aforesaid group. These materials are suitably selected according to the combination of the optical substrate and the refractive index of the medium.

The antireflection film is formed by a vacuum deposition method. Further, the antireflection film may also be formed by a vacuum deposition method in which an ion-assisted method is applied, depending on the film configuration of the antireflection film and the property of the deposition material. The film-forming method is not limited to the vacuum deposition method, but other film-forming methods can be used such as RF sputter method, ion beam sputter method, ion plating method, CVD (chemical vapor-deposition) method, sol-gel method, and the like.

An example and a comparative example of the optical element with the antireflection film according to the present invention will be described below.

(1) Example a. Substrate

In the example, as the optically transparent substrate 10, a plastic material was prepared, more specifically, a plastic lens (trade name: EYAS; manufactured by HOYA Corporation) whose main component is polythiol resin was prepared.

b. Hard film

A hard coat composition liquid was coated on the substrate 10 formed of polythiol resin, and the coated material was cured so as to form the hard film 11.

To be specific, a hard coat composition liquid containing inorganic particulates and a silane coupling agent was used as the material of the hard coat, wherein inorganic particulates were metal-oxide particulates mainly composed of tin (Sn) oxide, and the silane coupling agent was γ-glycidoxy propyl trimethoxy silane. Thereafter, the substrate 10 was immersed in the hard coat composition liquid, and then the coated material was cured by ultraviolet light irradiation, so that the hard film 11 was formed on the substrate 10, which was a plastic lens.

c. Antireflection film

The low refractive index layer 21 (i.e., the first layer), which also served as a foundation layer, of the antireflection film 2 was formed on the surface of the substrate 10, which was the plastic lens having the hard film 11 formed thereon as described above. Thereafter the high refractive index layer 22 (i.e., the second layer), the low refractive index layer 23 (i.e., the third layer), the high refractive index layer 24 (i.e., the fourth layer), the low refractive index layer 25 (i.e., the fifth layer), the high refractive index layer 26 (i.e., the sixth layer), and the low refractive index layer 27 (i.e., the seventh layer) were formed in this order, and thereby the antireflection film 2 was formed. In this example, silicon oxide ($SiO_2$) was used as the material of the low refractive index layers 21, 23, 25 and 27, and niobium oxide ($Nb_2O_3$) was used as the material of the high refractive index layers 22, 24 and 26. Each of the layers 21 to 27 was formed by an ion-assisted deposition method. The layer configuration, material, refractive index, optical film thickness and physical film thickness of the antireflection film 2 formed in the manner described above are shown in the following table 1. Incidentally, the film thickness management when forming each of the layers was performed by an optical film thickness measuring method in which the optical film thickness was calculated based on the reflectance measured with a reflectance meter. The reflectance meter was an Olympus USPM-RU manufactured by Olympus Corporation. Further, the optical film thickness shown in table 1 is an optical film thickness (calculated value $nd/\lambda$) when the wavelength $\lambda=500$ nm, and the physical film thickness is calculated based on the value of the optical film thickness.

TABLE 1

| Layer configuration of antireflection film | | Material | Refractive index | Optical film thickness (500 nm) | Physical film thickness (nm) |
|---|---|---|---|---|---|
| 1st layer | Low refractive index layer | $SiO_2$ | 1.48~1.48 | 0.0678 | 23.1 |
| 2nd layer | High refractive index layer | $Nb_2O_3$ | 2.2~2.3 | 0.0706 | 15.6 |
| 3rd layer | Low refractive index layer | $SiO_2$ | 1.48~1.48 | 0.1449 | 49.3 |
| 4th layer | High refractive index layer | $Nb_2O_3$ | 2.2~2.3 | 0.1697 | 37.5 |
| 5th layer | Low refractive index layer | $SiO_2$ | 1.48~1.48 | 0.0932 | 31.7 |
| 6th layer | High refractive index layer | $Nb_2O_3$ | 2.2~2.3 | 0.1507 | 33.3 |
| 7th layer | Low refractive index layer | $SiO_2$ | 1.48~1.48 | 0.2893 | 98.3 |

(2) Comparative Example

In the optical element of the comparative example, the material of the substrate and the material of the hard film were identical to those of the aforesaid example, the material of the low refractive index layers and the material of the high refractive index layers of the antireflection film were identical to those of the aforesaid example, but the film thickness configuration of the antireflection film of the comparative example was different from that of the aforesaid example. The layer configuration, material, refractive index, optical film thickness and physical film thickness of the antireflection film of the comparative example are shown in the following table 2.

TABLE 2

| Layer configuration of antireflection film | Material | Refractive index | Optical film thickness (500 nm) | Physical film thickness (nm) |
|---|---|---|---|---|
| 1st layer | Low refractive index layer | $SiO_2$ | 1.48~1.48 | 0.4660 | 158.4 |
| 2nd layer | High refractive index layer | $Nb_2O_3$ | 2.2~2.3 | 0.0548 | 12.1 |
| 3rd layer | Low refractive index layer | $SiO_2$ | 1.48~1.48 | 0.0586 | 19.9 |
| 4th layer | High refractive index layer | $Nb_2O_3$ | 2.2~2.3 | 0.1277 | 28.3 |
| 5th layer | Low refractive index layer | $SiO_2$ | 1.48~1.48 | 0.0534 | 18.1 |
| 6th layer | High refractive index layer | $Nb_2O_3$ | 2.2~2.3 | 0.1752 | 38.8 |
| 7th layer | Low refractive index layer | $SiO_2$ | 1.48~1.48 | 0.2705 | 91.9 |

Figure 2:
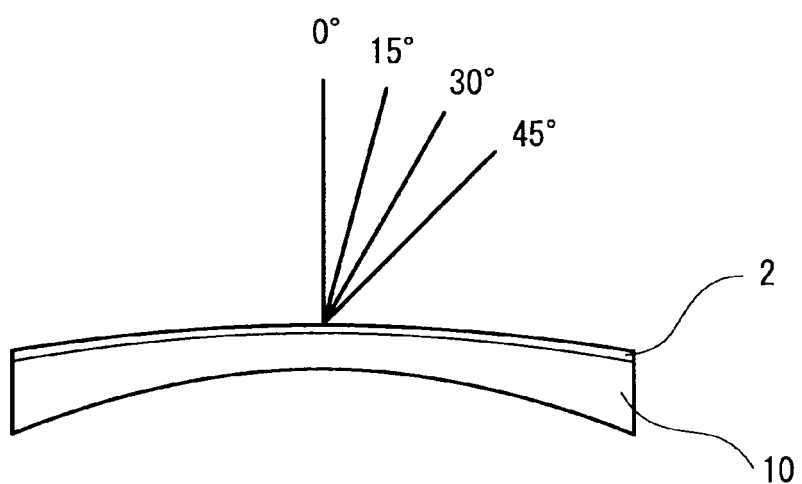
FIG. 2 is a view for explaining incident angle of light.
Figure 3:
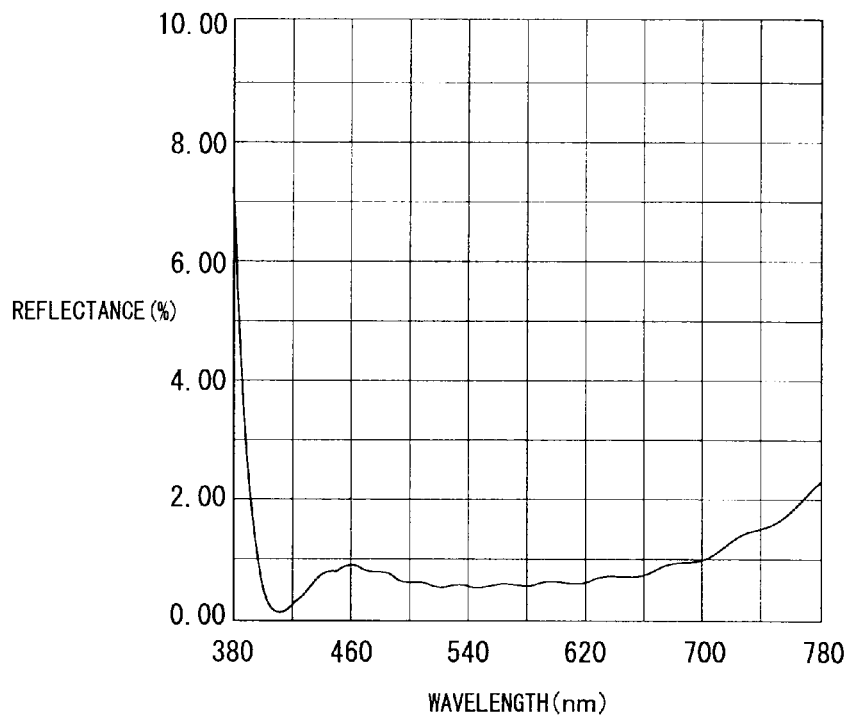
FIG. 3 is a graph showing reflection spectral characteristics of an optical element according to an example of the present invention in the case where incident angle is 0°.
Figure 4:
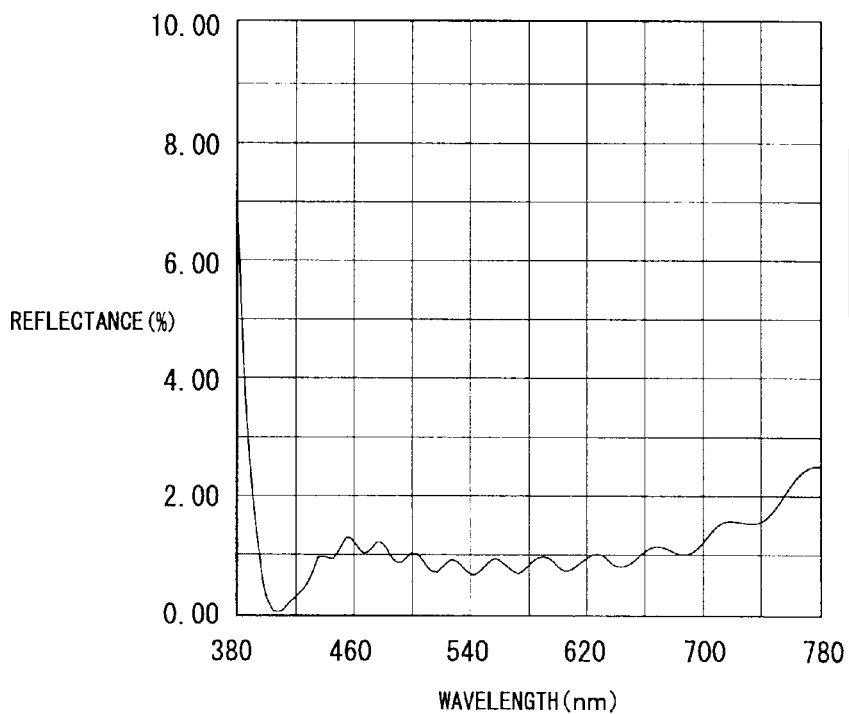
FIG. 4 is a graph showing the reflection spectral characteristics of the optical element according to the aforesaid example of the present invention in the case where the incident angle is 15°.
Figure 5:
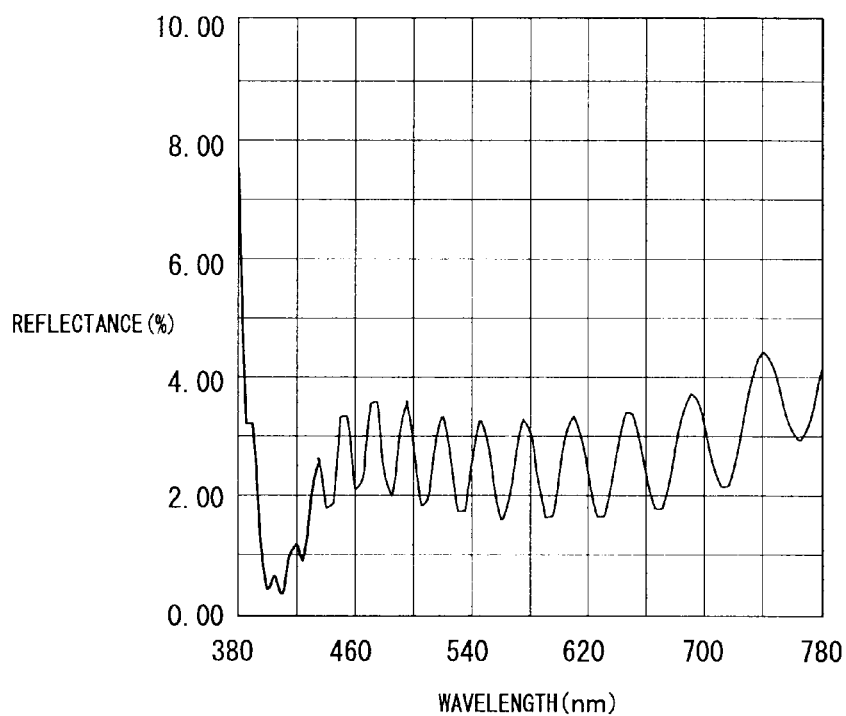
FIG. 5 is a graph showing the reflection spectral characteristics of the optical element according to the aforesaid example of the present invention in the case where the incident angle is 30°.
Figure 6:
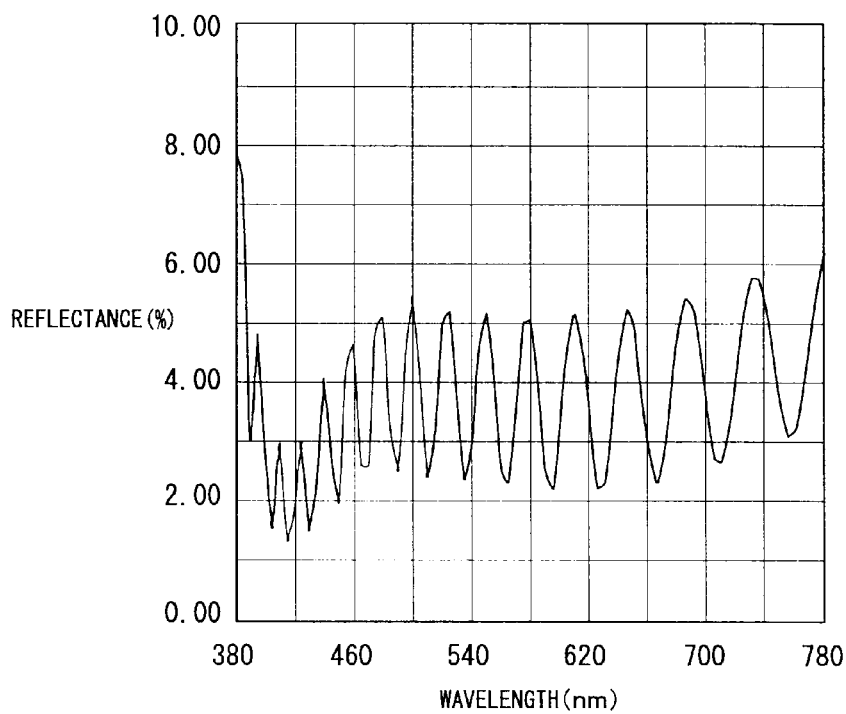
FIG. 6 is a graph showing the reflection spectral characteristics of the optical element according to the aforesaid example of the present invention in the case where the incident angle is 45°.
Figure 7:
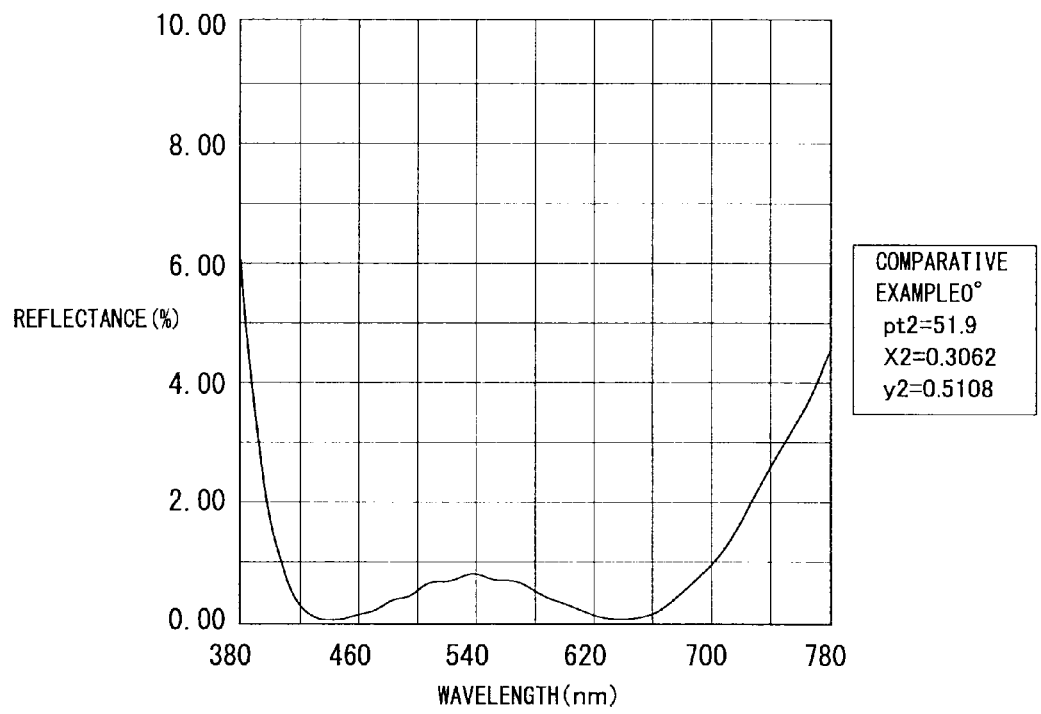
FIG. 7 is a graph showing the reflection spectral characteristics of an optical element according to a comparative example of the present invention in the case where the incident angle is 0°.
Figure 8:
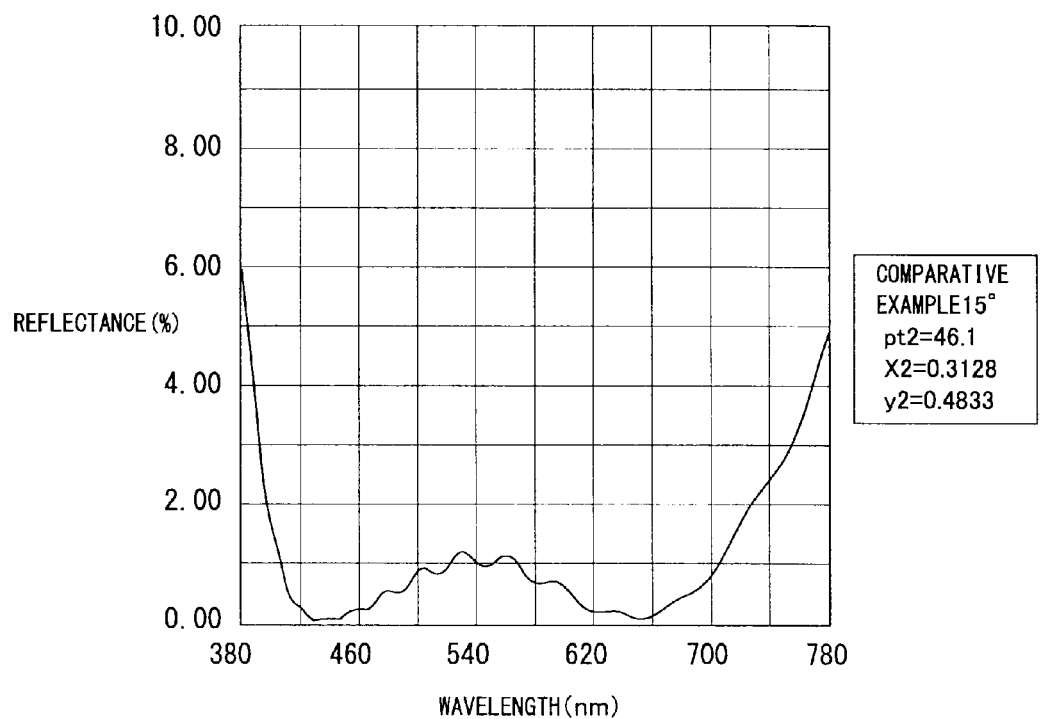
FIG. 8 is a graph showing the reflection spectral characteristics of the optical element according to the aforesaid comparative example of the present invention in the case where the incident angle is 15°.
Figure 9:
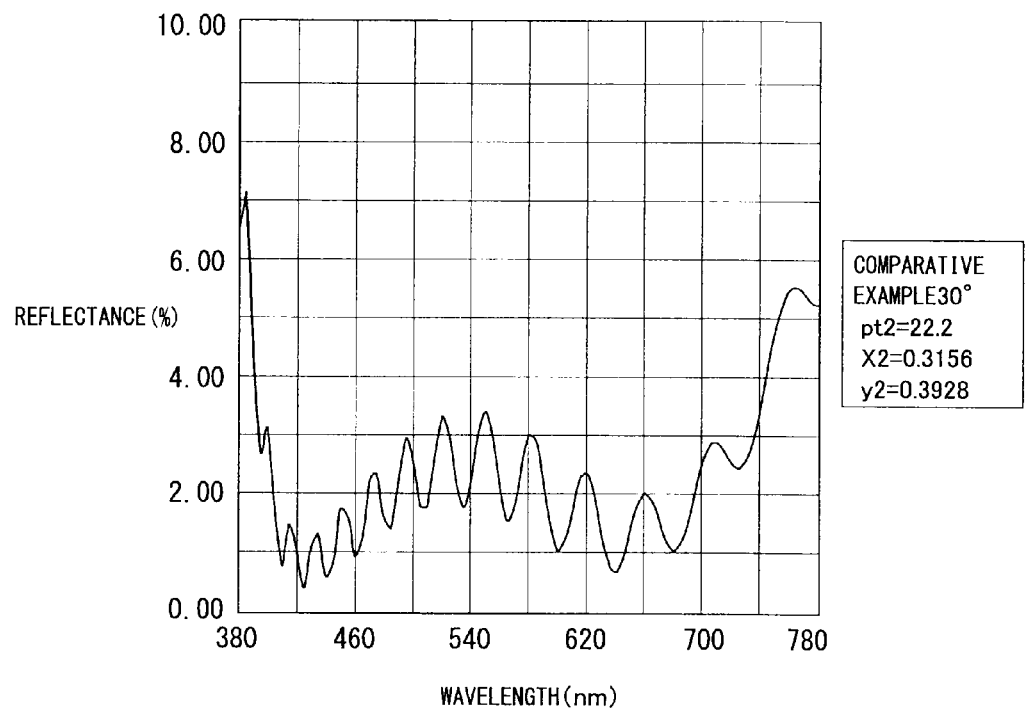
FIG. 9 is a graph showing the reflection spectral characteristics of the optical element according to the aforesaid comparative example of the present invention in the case where the incident angle is 30°.
Figure 10:
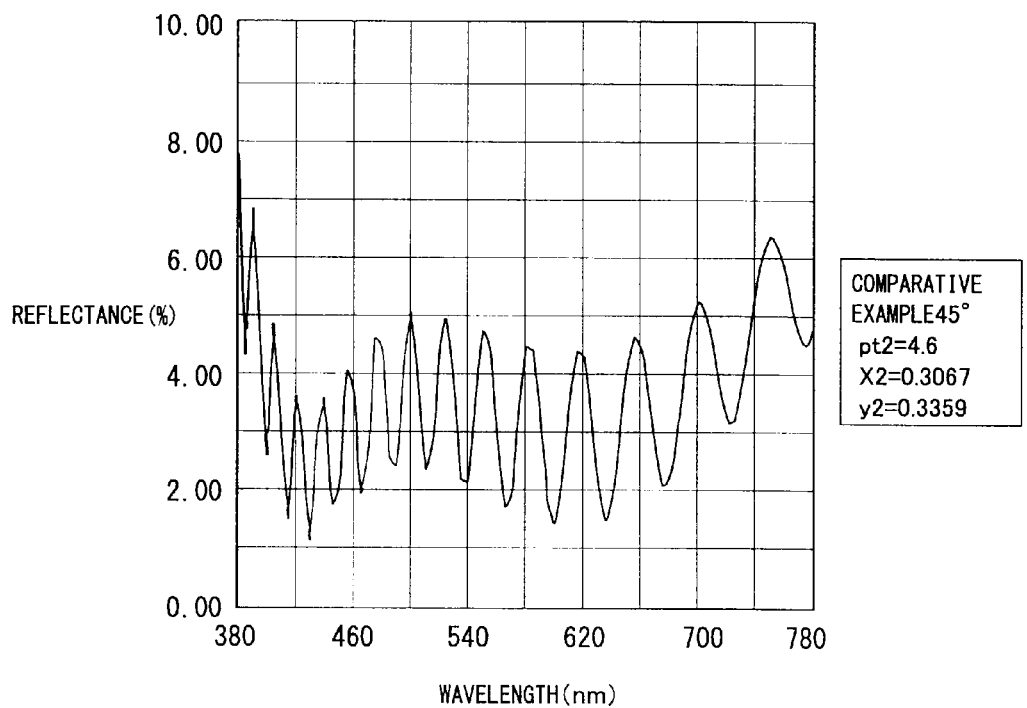
FIG. 10 is a graph showing the reflection spectral characteristics of the optical element according to the aforesaid comparative example of the present invention in the case where the incident angle is 45°.

In the optical element of the example and the optical element of the comparative example, reflection spectral characteristics were evaluated when light in the wavelength range from 380 nm to 780 nm (visible area) was respectively incident at an incident angle of 15°, 30° and 45° as shown in FIG. 2, when regarding the direction perpendicular to the surface of the substrate 1 (the surface of the antireflection film 2 was substantially in parallel with the surface of the substrate 1) as 0°. The result of the evaluation for the example is shown in FIGS. 3 to 6, and the result of the evaluation for the comparative example is shown in FIGS. 7 to 10.

It is known by comparing FIGS. 3 to 10 that, in the example, the reflectance of the incident light in the wavelength range from 380 nm to 780 nm is not higher than 10% across the whole wavelength range when the incident angle is within a range from 0° to 45° as shown in FIGS. 3 to 6. Further, it is known that, although there is an area near the wavelength of 420 nm where the reflectance is inhibited, the overall reflectance is substantially maintained flat (plateau). In other words, substantially constant reflectance is maintained across the all wavelength bands in the visible area. Thus, the interference color is maintained as white.

On the other hand, in the comparative example, although the reflectance of the incident light in the wavelength range from 380 nm to 780 nm is not higher than 10% across the whole wavelength range when incident angle is within a range from 0° to 45° as shown in FIGS. 7 to 10, variation caused by wavelength is larger than that of the example, and the overall graph is substantially W-shaped accompanied by waves. As a result, since the reflectance is extremely inhibited near the wavelength of 400 nm and near the wavelength of 640 nm, the antireflection film of the comparative example shows a green interference color.

Further, as also shown in FIGS. 3 to 10, excitation purity pt2 and chromaticity coordinates x2 and y2 were calculated based on the spectral characteristics of the light of each of the incident angles. The excitation purity is an index indicating denseness of the color calculated based on the chromaticity coordinates obtained from the spectral characteristics, and is calculated using a method defined by JIS Z 8701. To be specific, spectral tristimulus values (X, Y and Z) of a standard light source D65 (a representative of daylight light source defined by the CIE (International Commission on Illumination) and ISO (International Organization for Standardization) and having a color temperature of D6504K) are obtained based on the reflection spectral characteristics of each example using the formula defined by JIS Z 8701, and ratio of X component to the sum of the tristimulus values (X+Y+Z) and ratio of Y component to the sum of the tristimulus values (X+Y+Z) are calculated to obtain the chromaticity coordinates x2 and y2. The values of the chromaticity coordinates (x2, y2) corresponding to the spectral characteristics of each of the incident angles of the example and the comparative example are shown in table 3. Further, each chromaticity coordinates indicated in a chromaticity diagram is shown in FIG. 11.

TABLE 3

| | 0° (x2, y2) | 15° (x2, y2) | 30° (x2, y2) | 45° (x2, y2) |
|---|---|---|---|---|
| Comparative example c | (0.306, 0.511) △ | (0.313, 0.483) △ | (0.316, 0.393) ▲ | (0.307, 0.336) X |
| Example e | (0.303, 0.291) ● | (0.303, 0.299) ⊙ | (0.309, 0.321) ○ | (0.318, 0.34) ◌ |
| C light source | (0.31, 0.316) ◊ | | | |

Figure 11:
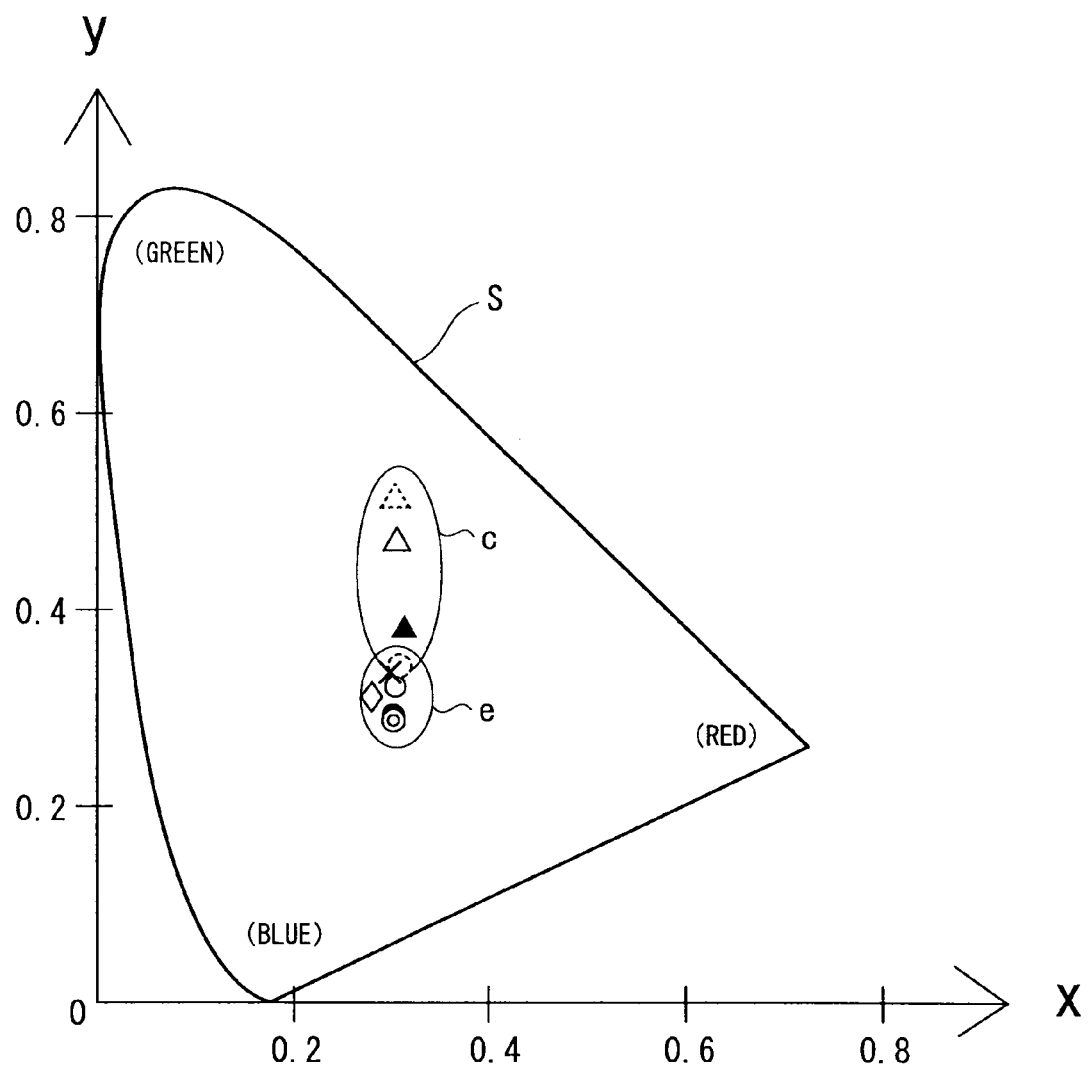
FIG. 11 shows chromaticity coordinates of a chromaticity diagram of the optical element according to the aforesaid example and the optical element according to the comparative example of the present invention.

In the chromaticity diagram shown in FIG. 11, an intersection of a straight line extending from the origin of the standard light source (marked as ◊) and passing through each chromaticity coordinates (x2, y2) and a spectrum locus S in the chromaticity coordinates is the dominant wavelength, i.e., the dominant wavelength of the reflected light of each of the incident angles. The excitation purity pt2 can be obtained based on the ratio of the distance between the origin and the intersection to the distance between the origin and the chromaticity coordinates (x2, y2). Incidentally, the spectral tristimulus values are values in an XYZ colorimetric system based on a visual field of 2 degrees recommended by CIE (i.e., a CIE colorimetric system). The excitation purity pt2 at each of the incident angles of both the example and the comparative example calculated based on the chromaticity coordinate, and difference Δpt2 between the excitation purity at incident angle 0° (perpendicularly incident) and excitation purity at each of other incident angles are shown in table 4. The color will be dilute (close to white) if the value of the excitation purity is small and will be dense (far away from white) if the value of the excitation purity is large.

TABLE 4

| Incident angle | | 0° | 15° | 30° | 45° |
|---|---|---|---|---|---|
| Example | Excitation purity (pt2) | 8.9 | 6.6 | 1.1 | 8.4 |
| | (Δ pt2) | — | 2.3 | 7.8 | 0.5 |
| Comparative Example | Excitation purity (pt2) | 51.9 | 46.1 | 22.2 | 4.6 |
| | (Δ pt2) | — | 5.8 | 29.7 | 47.3 |

It is known from the above result that, in the example, the reflectance of the visible light in the wavelength range from 380 nm to 780 nm is not higher than 10%, the excitation purity at each of the incident angles is not larger than 10, the reflectance is sufficiently low, and the color tone of the interference color is dilute. Further, it is obvious that Δpt2, which represents difference of excitation purity between difference incident angles, is also inhibited to 10 or less, and the interference color is less likely to vary due to the variation of the incident angle of the light. In the case where a spectacle plastic lens is configured using the optical element and the antireflection film of the example, since the color tone of the interference color is maintained dilute, the appearance of the spectacles and the impression of the user who wears the spectacles will less likely to be changed due to the interference color depending on the direction at which the spectacles is looked by other people.

As described above, since the spectacle lens worn by the user is looked by other people from various different angles and since the spectacle lens has relatively small curvature radius and is formed as spherical or aspheric curved surface, there occurs a phenomenon in which the incident angle of light is different depending on different points on the surface of the lens. As described above, in the case of the optical element and the antireflection film of the present invention, since the reflection is inhibited not only for the incident light coming from the direction perpendicular to the surface but for the incident light coming from the oblique direction of 45°, and since the excitation purity is low (i.e., the interference color is close to white color), the optical element and the antireflection film of the present invention is very suitable to be applied to a spectacle lens, and particularly there is an advantage that the color tone of a colored spectacle lens will not be adversely affected. Thus, added value can be increased by applying the present invention to a spectacle lens with a colored lens substrate.

On the other hand, in the comparative example, the excitation purity of the perpendicular direction (0°) is 51.9, which is a very large value. Further, it is known that Δpt2, which represents difference of excitation purity between difference incident angles, also largely changes, and the denseness of the color largely changes depending on the angle at which the optical element is looked. In the case where a spectacle plastic lens is configured using the optical element of the comparative example, a green interference color will be seen on the surface of the lens when looking the wearer of the spectacles from the front, while a substantially white interference color will be seen on the surface of the lens when looking the wearer of the spectacles at an angle of 45°. In the case of a sunglasses having a colored lens substrate, since the impression of the color of the lens tends to vary due to the interference color, if the optical element and antireflection film of the comparative example is applied to such a colored lens, the color tone will vary due to the variation of the incident angle of light, and the color tone of the interference color will become dense depending on the incident angle of the light, and therefore there is a concern that the impression of the colored lens will change.

In the aforesaid example, silicon oxide was used as the low refractive index layer of the antireflection film 2, niobium oxide was used as the high refractive index layer of the antireflection film 2, and the total number of the layers was seven, however the material, the total number of the layers and the optical film thickness of the antireflection film according to the present invention are not limited thereto. For example, in the case where silicon oxide is used as the low refractive index layer and niobium oxide is used as the high refractive index layer, it is also possible to inhibit the excitation purity and inhibit the interference color even if the optical film thickness is changed within the range shown in the following table 5 corresponding to variation in refractive index.

TABLE 5

| Layer configuration of antireflection film | | Design value (Optical film thickness) | Design value (nm) | Refractive index low | Refractive index high | Low refractive index −5% | High refractive index +5% |
|---|---|---|---|---|---|---|---|
| 1st layer | Low refractive index layer | 0.0678 | 23.04555 | 0.067 | 0.068 | 0.064 | 0.072 |
| 2nd layer | High refractive index layer | 0.0706 | 15.61947 | 0.069 | 0.072 | 0.065 | 0.075 |
| 3rd layer | Low refractive index layer | 0.1449 | 49.25221 | 0.144 | 0.146 | 0.137 | 0.153 |
| 4th layer | High refractive index layer | 0.1667 | 36.88053 | 0.162 | 0.170 | 0.154 | 0.178 |
| 5th layer | Low refractive index layer | 0.0932 | 31.67913 | 0.093 | 0.094 | 0.088 | 0.098 |
| 6th layer | High refractive index layer | 0.1507 | 33.34071 | 0.147 | 0.153 | 0.139 | 0.161 |
| 7th layer | Low refractive index layer | 0.2893 | 98.33447 | 0.287 | 0.291 | 0.273 | 0.306 |

In the aforesaid example, each of the layers of the antireflection film is formed by the ion-assisted deposition method. However, in the case where the antireflection film is formed by depositing an inorganic oxide, for example, a certain level of variation in refractive index of the inorganic oxide will occur. In the case of forming the antireflection film by deposition, the level of variation in refractive index of silicon oxide is 1.46 to 1.48, and the level of variation in refractive index of niobium oxide is 2.2 to 2.3. In the above table 5, in addition to the optical film thickness and physical film thickness (nm) of the design value, a case of the lower limit and a case of the upper limit of the variation in refractive index are respectively indicated as "refractive index low" and "refractive index high". In addition to the above items, the optical film thickness in the case where accuracy of film thickness control is +5% and the optical film thickness in the case where accuracy of film thickness control is −5% are respectively indicated as "low refractive index −5%" and "high refractive index +5%", which are respectively considered as the lower limit and upper limit of allowable optical film thickness.

In other words, in the case where silicon oxide is used as the low refractive index layer, niobium oxide is used as the high refractive index layer, and the total number of the layers of the laminated refractive index layer is seven, the allowance of each of the layers from the first layer to the seventh layer from the side of the substrate is:

First layer: 0.064~0.072
Second layer: 0.065~0.075
Third layer: 0.137~0.153
Fourth layer: 0.154~0.178
Fifth layer: 0.088~0.098
Sixty layer: 0.139~0.161
Seventh layer: 0.273~0.306

Incidentally, the value of each of the optical film thicknesses is a calculated value (nd/λ) calculated when wavelength λ=500 nm.

Further, it is considered that the allowance of each of the optical film thicknesses varies according to the material of the low refractive index layer, the material of the high refractive index layer, and the total number of the laminated layers, and it is known by comparing the aforesaid example with the comparative example that the film thickness the first layer, which is a low refractive index layer, of the example is a quite small value compared with that of the comparative example. Thus, it can be presumed that the configuration in which the excitation purity in the reflection characteristics is inhibited to 10 or lower (which is a sufficiently low value) when the incident angle is within the range from 0° to 45° is achieved by reducing the optical film thickness of the first layer, which is a low refractive index layer, to a relatively small value not larger than 0.1λ (λ=500 nm).

Thus, in the present invention, it is preferred that the optical film thickness of the first layer, which the low refractive index layer, from the side of the substrate of the antireflection film is not larger than 0.1λ when the wavelength of light is λ=500 nm.

On the other hand, if the thickness of the first layer, which is a low refractive index layer, is too small, sufficient hardness can not be obtained, therefore causing problems in physical strength. In order to maintain sufficient hardness, it is preferred that the physical thickness is not less than 15 nm, i.e., the physical thickness is not less than 0.03λ (λ=500 nm).

Thus, it is preferred that the optical film thickness of the first layer is in a range from 0.03λ to 0.1λ (λ=500 nm). Particularly, in the case where $SiO_2$ is used as the low refractive index layer and $Nb_2O_3$ is used as the high refractive index layer, it is more preferred that the optical film thickness of the first layer is in a range from 0.05λ to 0.08λ.

Further, it is also known, by comparing each of other layers than the first layer of the antireflection film of the example with that of the comparative example, that the film thickness of the third layer of the example is particularly larger than that of the comparative example, and the difference is large. This is because the small thickness of the first layer, which is a low refractive index layer, is compensated by the large thickness of the third layer, which is a low refractive index layer. From the results of tables 1, 2 and 5, it can be said that it is preferred to set the thickness of the third layer is in a range from 0.1λ to 0.2λ (λ=500 nm) to compensate the small thickness of the first layer. Particularly, in the case where $SiO_2$ and $Nb_2O_3$ are respectively used as the low refractive index layer and the high refractive index layer, it is more preferred that the thickness of the third layer is set in a range from 0.12λ to 0.17λ (λ=500 nm).

Further, the film thickness of the second layer of the antireflection film of the example is slightly smaller. From the results of tables 1, 2 and 5, it can be said that it is preferred to set the optical film thickness of the second layer in a range from 0.06λ to 0.09λ (λ=500 nm).

Further, it is thought that the reflection characteristics when the incident angle is in the range from 0° to 45° as described above will change depending on the material of the substrate. It is known, based on the calculation result calculated by the inventor of the present invention, that the same effect as the aforesaid example can be achieved if the refractive index of the substrate is in a range from 1.5 to 1.8. Thus, it is preferred that an optically transparent material whose refractive index is in a range from 1.5 to 1.8 is used as the material of the substrate.

It is to be understood that the present invention is not limited to the configuration described in the embodiment described above, and various modifications and applications can be made without departing from the spirit of the present invention described in the claims.

| Explanation of Reference Numerals | |
|---|---|
| 1 | optical element |
| 2 | antireflection film |
| 10 | substrate |
| 11 | hard film |
| 21 | low refractive index layer |
| 22 | high refractive index layer |
| 23 | low refractive index layer |
| 24 | high refractive index layer |
| 25 | low refractive index layer |
| 26 | high refractive index layer |
| 27 | low refractive index layer |

The invention claimed is:

1. A spectacle lens comprising:
an optically transparent substrate; and
an antireflection film formed on at least one surface of the substrate, wherein
the antireflection film is formed by alternately laminating a low refractive index layer and a high refractive index layer, such that a plurality of low and high refractive index layers are alternately formed on the substrate,
the antireflection film has a reflectance of 10% or less and an excitation purity range of 10 or less for visible light in a wavelength range from 380 nm to 780 nm incident at an incident angle ranging from 0° to 45° when regarding the direction perpendicular to the surface of the substrate as 0°,
a material of the low refractive index layers of the antireflection film is silicon dioxide,
a material of the high refractive index layers of the antireflection film is niobium oxide,
a first layer of the antireflection film that is formed on the substrate is one of the low refractive index layers, and has an optical thickness between 0.05λ and 0.08λ, where λ=500 nm,
a second layer of the antireflection film that is formed on the first layer is one of the high refractive index layers, and
a third layer of the antireflection film that is formed on the second layer is one of the low refractive index layers, and has an optical thickness between 0.12λ and 0.17λ.

2. The spectacle lens according to claim 1, wherein the refractive index of the substrate is within a range of from 1.5 to 1.8.

3. The spectacle lens according to claim 2, further comprising a hard film formed between the antireflection film and the substrate.

4. The spectacle lens according to claim 2, wherein the second layer of the antireflection film, which is one of the high refractive index layers, has an optical thickness between 0.06λ and 0.09λ.

5. The spectacle lens according to claim 2, wherein:
the antireflection film includes seven refractive index layers, including the first, second and third layers, fourth and sixth layers that are each one of the high refractive index layers, and fifth and seventh layers that are each one of the low refractive index layers,
the fourth, fifth, sixth and seventh layers are respectively formed on the third, fourth, fifth and sixth layers, the optical thickness of the first layer is between 0.064λ and 0.072λ, an optical thickness of the second layer is between 0.065λ and 0.075λ, the optical thickness of the third layer is between 0.137λ and 0.153λ, an optical thickness of the fourth layer is between 0.154λ and 0.178λ, an optical thickness of the fifth layer is between 0.088λ and 0.098λ, an optical thickness of the sixth layer is between 0.139λ and 0.161λ, and an optical thickness of the seventh layer is between 0.273λ and 0.306λ.

6. The spectacle lens according to claim 1, further comprising a hard film formed between the antireflection film and the substrate.

7. The spectacle lens according to claim 6, wherein the second layer of the antireflection film, which is one of the high refractive index layers, has an optical thickness between 0.06λ and 0.09λ.

8. The spectacle lens according to claim 6, wherein:

the antireflection film includes seven refractive index layers, including the first, second and third layers, fourth and sixth layers that are each one of the high refractive index layers, and fifth and seventh layers that are each one of the low refractive index layers, the fourth, fifth, sixth and seventh layers are respectively formed on the third, fourth, fifth and sixth layers, the optical thickness of the first layer is between 0.064λ and 0.072λ, an optical thickness of the second layer is between 0.065λ and 0.075λ, the optical thickness of the third layer is between 0.137λ and 0.153λ, an optical thickness of the fourth layer is between 0.154λ and 0.178λ, an optical thickness of the fifth layer is between 0.088λ and 0.098λ, an optical thickness of the sixth layer is between 0.139λ and 0.161λ, and an optical thickness of the seventh layer is between 0.273λ and 0.306λ.

9. The spectacle lens according to claim 1, wherein the second layer of the antireflection film, which is one of the high refractive index layers, has an optical thickness between 0.06λ and 0.09λ.

10. The spectacle lens according to claim 1, wherein:

the antireflection film includes seven refractive index layers, including the first, second and third layers, fourth and sixth layers that are each one of the high refractive index layers, and fifth and seventh layers that are each one of the low refractive index layers, the fourth, fifth, sixth and seventh layers are respectively formed on the third, fourth, fifth and sixth layers, the optical thickness of the first layer is between 0.064λ and 0.072λ, an optical thickness of the second layer is between 0.065λ and 0.075λ, the optical thickness of the third layer is between 0.137λ and 0.153λ, an optical thickness of the fourth layer is between 0.154λ and 0.178λ, an optical thickness of the fifth layer is between 0.088λ and 0.098λ, an optical thickness of the sixth layer is between 0.139λ and 0.161λ, and an optical thickness of the seventh layer is between 0.273λ and 0.306λ.

11. The spectacle lens according to claim 10, wherein the antireflection film consists of the seven refractive index layers.

12. The spectacle lens according to claim 1, wherein:

an optical thickness of the second layer is between 0.065λ and 0.075λ.

* * * * *